United States Patent
Ueda et al.

[11] Patent Number: 5,931,220
[45] Date of Patent: *Aug. 3, 1999

[54] HEAT EXCHANGER

[75] Inventors: Shinichi Ueda, Shiga; Toshinori Tokutake, Tochigi, both of Japan

[73] Assignee: Showa Aluminum Corporation, Osaka, Japan

[*] Notice: This patent is subject to a terminal disclaimer.

[21] Appl. No.: 08/879,082

[22] Filed: Jun. 19, 1997

Related U.S. Application Data

[63] Continuation of application No. 08/674,985, Jul. 3, 1996, abandoned, which is a continuation of application No. 08/445,703, May 22, 1995, which is a continuation of application No. 08/071,566, Jun. 1, 1993, Pat. No. 5,441,100.

[30] Foreign Application Priority Data

Jun. 2, 1992 [JP] Japan ................................ 4-141265

[51] Int. Cl.⁶ ......................................................... F28F 9/00
[52] U.S. Cl. .............................................. 165/67; 165/149
[58] Field of Search .............................. 180/68.4; 165/67, 165/149

[56] References Cited

U.S. PATENT DOCUMENTS

| | | | |
|---|---|---|---|
| 1,597,720 | 8/1926 | Carrier | 165/149 |
| 4,141,409 | 2/1979 | Woodhull, Jr. et al. | 165/110 |
| 4,945,635 | 8/1990 | Nobusue et al. | 29/890.043 |

FOREIGN PATENT DOCUMENTS

| | | | |
|---|---|---|---|
| 2648407 | 4/1978 | Germany | 180/68.4 |
| 57-84223 | 5/1982 | Japan | 180/68.4 |
| 1-314624 | 12/1989 | Japan | 180/68.4 |
| 1221033 | 2/1971 | United Kingdom | 165/149 |

*Primary Examiner*—Allen Flanigan

[57] ABSTRACT

A heat exchanger has a plurality of flat tubes which alternate with fins, and the tubes and the fins are disposed one on another. Both ends of each tube are connected to a pair of right-hand and left-hand headers, in fluid communication with them. The headers have their ends closed with caps, and each cap has a pin integral with it so as to hold in place a bracket which is used to mount the heat exchanger on a structural base. The integral pins protrude upwards or downwards from the caps.

4 Claims, 9 Drawing Sheets

HEAT EXCHANGER

This application is a continuation of application Ser. No. 08/674,985, filed Jul. 3, 1996, now abandoned, which is a con of Ser. No. 08/445,703 filed May 22, 1995, which is a con of Ser. No. 08/071,566 filed Jun. 01, 1993, now U.S. Pat. No. 5,441,100.

BACKGROUND OF THE INVENTION

1. Technical Field of the Invention

The present invention relates to a heat exchanger, and more particularly to a heat exchanger which is adapted for use in an automobile or household air conditioner.

2. Prior Art

The heat exchangers of the so-called multi-flow type or parallel flow type comprise in general a plurality of parallel tubes each having both ends connected to a pair of right-hand and left-hand hollow cylindrical headers in fluid communication therewith and a plurality of corrugated fins each interposed between the adjacent tubes. Such heat exchangers have preferentially been employed more and more for example in the car coolers, because they have a higher capacity and better performance of heat exchange, cause a less extent of pressure loss and can be designed extremely compact.

Generally, the heat exchangers of said type are provided each with one or more brackets used to secure them to an object or structural base such as an automobile body.

FIG. 18 shows an example of the prior art bracket 351 which has a pair of fastenable tabs 352 integrally extending from the bracket. Those tabs are disposed fore and aft with respect to a heat exchanger core which consists of the tubes 353 and corrugated fins 354. A bolt 355 penetrates the tabs 352 and 352 gripping the core so that the bracket is fixed in place by this bolt which extends through a gap between the adjacent tubes 353 and 353.

In case of attaching the bracket 351 to the heat exchanger by means of the bolt 355 extending between the tubes 353, there has however been a likelihood that the bolt collides with and causes damage to the tubes. Further, it takes much labor and time to thereby lower the productivity of the heat exchanger.

In addition, the heat exchangers mounted by such a bracket 351 on the automobile body have proved less rigid and less resistant to torsion, thus tending to be broken early.

OBJECTS AND SUMMARY OF THE INVENTION

An object of the present invention which was made in view of the problems in the prior art structure is therefore to provide such a heat exchanger that any suitable brackets can be attached thereto efficiently but without causing damage to the tubes in the heat exchanger.

Another object is to improve the torsional rigidity of the heat exchanger which is operating after installed.

Still further objects and advantages of the invention will become apparent from the preferred embodiments, which will be described hereinafter only in way of example and may be modified without departing from the spirit and scope of the invention.

In one of the best modes of the invention, a heat exchanger comprises tubes, fins, right-hand and left-hand hollow cylindrical headers, upper and lower caps brazed to and liquid-tightly closing upper and lower open ends of the headers, respectively, the fins alternating with the tubes each having both ends connected to the headers in fluid communication therewith, and pins formed integral with and protruding from at least one of the upper and lower caps attached to each header, wherein the pins are adapted to secure thereto brackets for mounting the heat exchanger on a structural base such as an automobile body.

According to this mode, the pins protruding from the caps on the headers are utilized to attach in an efficient manner the brackets to the heat exchanger, without a fear that any tube would be damaged by the brackets.

Each pin may preferably be a male-threaded short rod which mates a nut fastened thereto to easily attach each bracket to the header.

In another preferable mode of the invention, a heat exchanger comprises: tubes and fins alternating with one another and stacked one on another; a pair of hollow headers; each tube having both ends connected to the headers in fluid communication therewith; an upper and lower caps brazed to and liquid-tightly closing an upper and lower open ends of each header, respectively; all the caps having pins extending coaxially with the respective headers; and the pins formed integral with and protruding upwards or downwards respectively from the upper or lower caps, wherein at least one pair of the upper or lower pins are adapted to secure thereto one or more brackets for mounting the heat exchanger on a structural base such as an automobile body.

The four pins in this case, with two of them disposed on the upper ends of the right-hand and left-hand headers and with the two remaining pins being disposed at the lower ends of said headers, may be used to further facilitate the mounting of the heat exchanger on the automobile body or the like. A single bracket may possibly be attached to the pair of upper or lower pins so as to improve the mechanical strength, particularly torsional rigidity, of heat exchanger.

Each pin may be coated with an elastic buffer material such as rubber, if required. This coating will protect the heat exchanger by absorbing a strong vibrational energy imparted thereto from the automobile body.

THE PREFERRED EMBODIMENTS

First Embodiment

Figure 1:
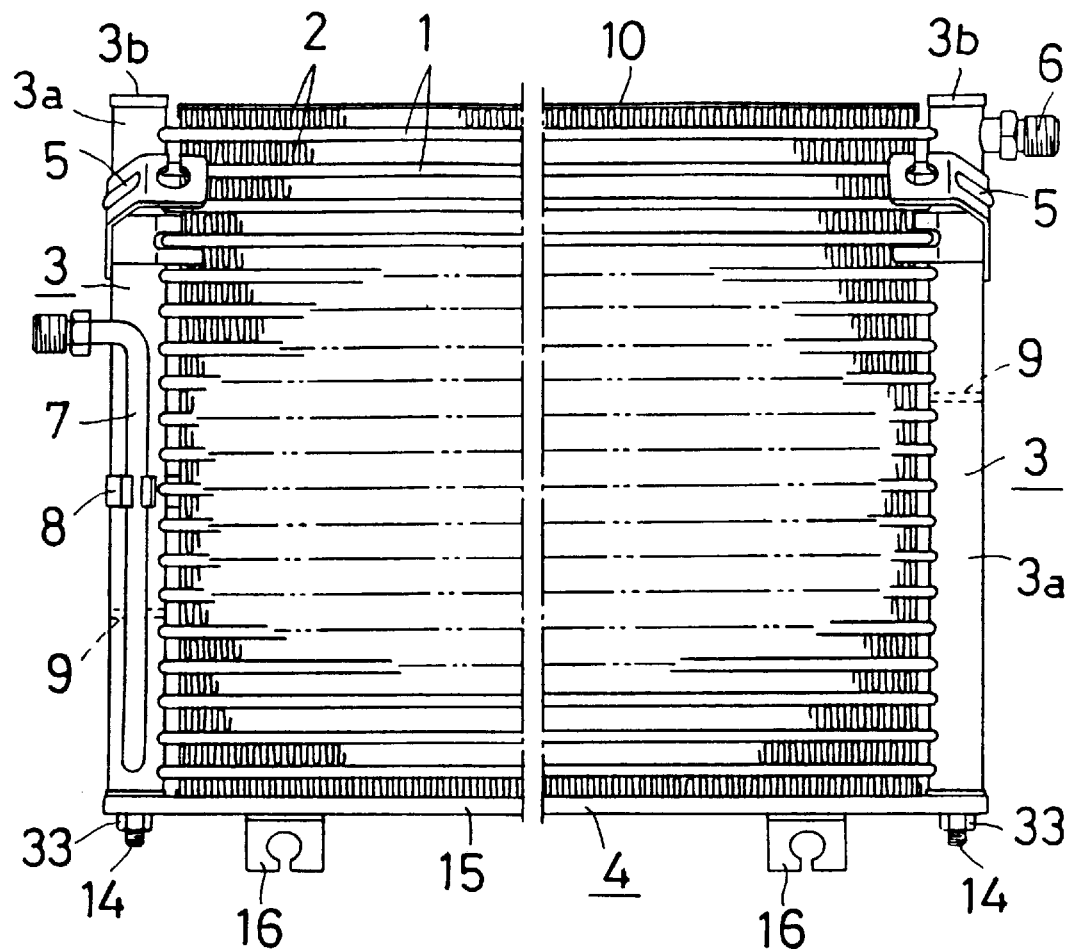
FIG. 1 is a front elevation of a heat exchanger provided in a first embodiment of the present invention.

FIGS. 1 to 8 illustrate a multi-flow type heat exchanger which is for example a condenser made of aluminum and employed in a car air conditioner.

This condenser comprises a plurality of flat tubes 1 alternating with corrugated fins 2, which tubes 1 and fins 2 extend in parallel with one another and are disposed one on another. A pair of right-hand and left-hand headers 3 and 3 are connected to respective ends of the tubes 1 in fluid communication therewith.

A lower bracket 4 is attached to a bottom portion of the heat exchanger so as to secure it to a structural base such as an automobile body. Upper brackets 5 are for securing upper portions of the heat exchanger to the automobile body or the like. Indicated at the numerals 6 and 7 are a coolant inlet and a coolant outlet, respectively. An additional bracket 8 supports an intermediate portion of the coolant outlet 7.

The numeral 9 denotes partitions. Each partition divides the interior of the header 3 at a given height thereof. Internal chambers or compartments thus formed do cause a coolant to flow in a meandering manner through groups of the tubes 1, one group after another. Side plates 10 extend outside the uppermost and lowermost corrugated fins 2 so as to protect them.

Figure 3:
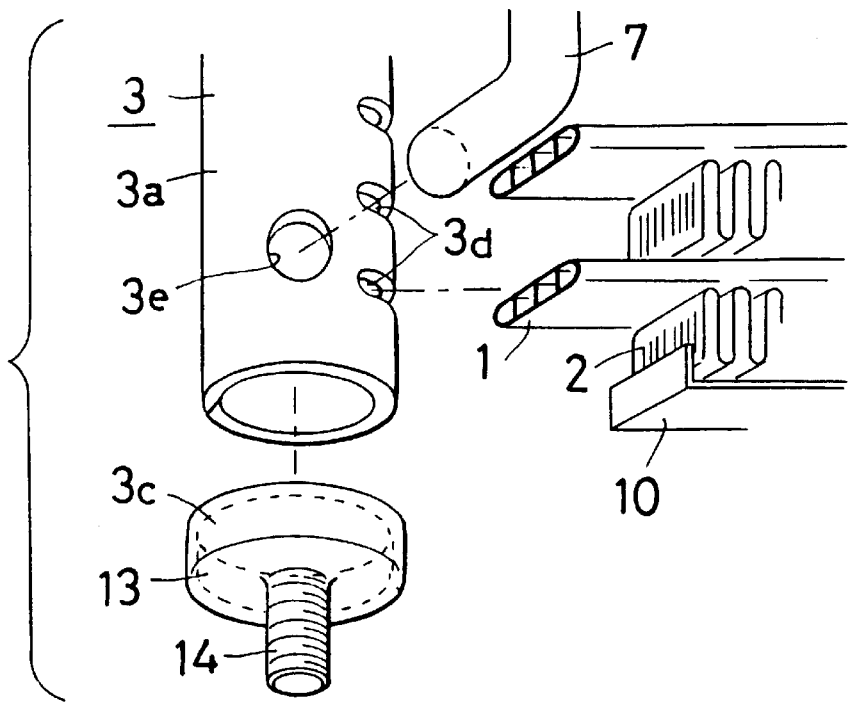
FIG. 3 is a perspective view showing, in their disassembled state, a cylindrical header, a cap and tubes employed in the heat exchanger.

The flat tubes 1 as one of the structural members in the heat exchanger are aluminum tubes produced by the extrusion method. Each of these 'harmonica tubes' comprises internal reinforcing walls which divide its interior into some longitudinal compartments as shown in FIG. 3, to thereby improve its pressure resistance. Alternatively, the tubes may be those which are produced by the seam welding or the brazing process.

The fins 2 are made from a sheet of the same width as the tubes 1. This sheet is corrugated and louvers are opened up from it, wherein the sheet is an aluminum sheet clad with a brazing agent layer.

Each header 3 comprises a header pipe 3a and aluminum caps 3b and 3c. The header pipe 3a is made from a similar aluminum sheet which has an outer surface or both surfaces clad with a brazing agent layer. This sheet is bent so that its side edges abut one another to form a cylindrical pipe. Each of the caps 3b and 3c is a cover fitted on and closing the open end of the header pipe.

The header pipe 3a has, in its peripheral wall, a row of tube insertion apertures 3d which are circumferential slots spaced apart one from another. Those apertures arranged longitudinally of the pipe are for receiving the inserted ends of each tube 1. The header pipe has also an opening 3e receiving the end of the coolant outlet through which the coolant leaves the header. A seam welded pipe or an extruded pipe may be employed in place of the brazed pipe.

Among the header caps 3b and 3c, those 3c which close the lower ends of the header pipes 3a are of such a shape as shown in FIG. 3. Each cap 3c comprises a cap body 13 and a male-threaded and stud-shaped pin 14. The cap body 13 is a shallow cylindrical dish fitted tight on the pipe end. The pin 14 is integral with and protruding downwards from the bottom of said body 13. Such header caps 3c may be manufactured using an aluminum alloy which is of a good brazeability and a high mechanical strength, and preferable examples include the alloys of 7N01-series and 7000-series containing a lesser amount of Mg.

Figure 2:
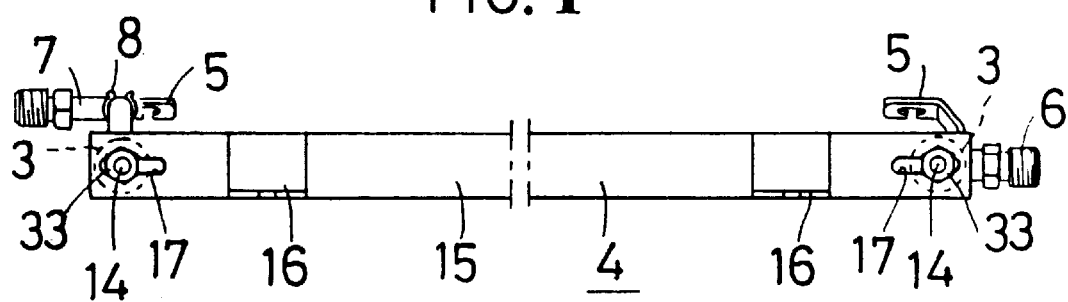
FIG. 2 is a bottom plan view of the heat exchanger.
Figure 4:
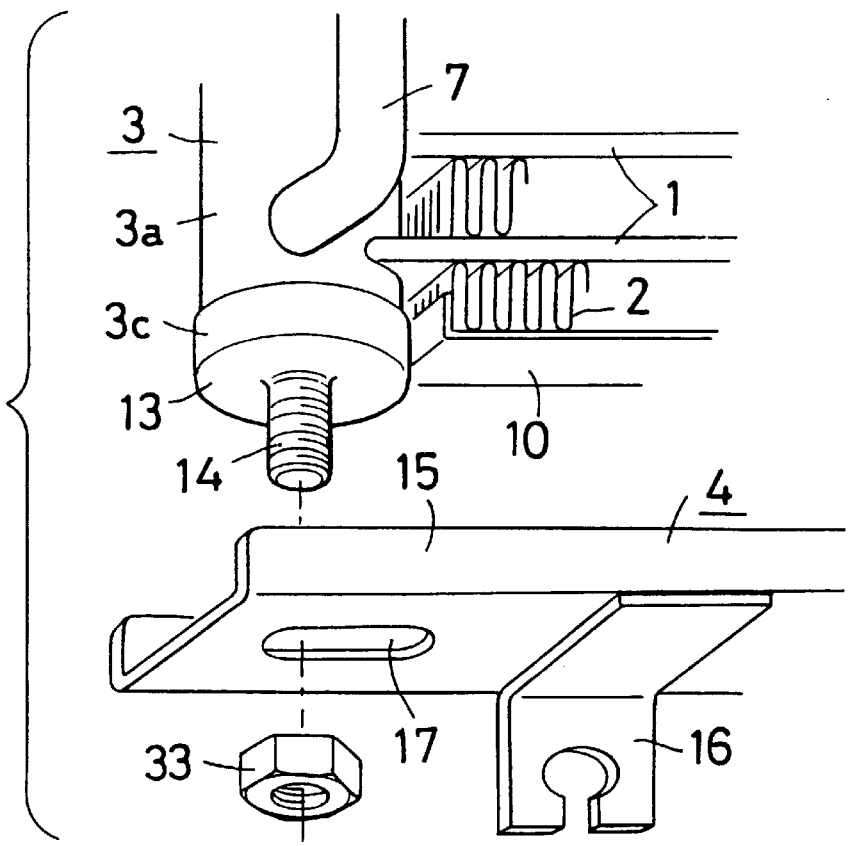
FIG. 4 is a perspective view of the members shown in FIG. 3 in their assembled state, together with a lower bracket separated.
Figure 5:
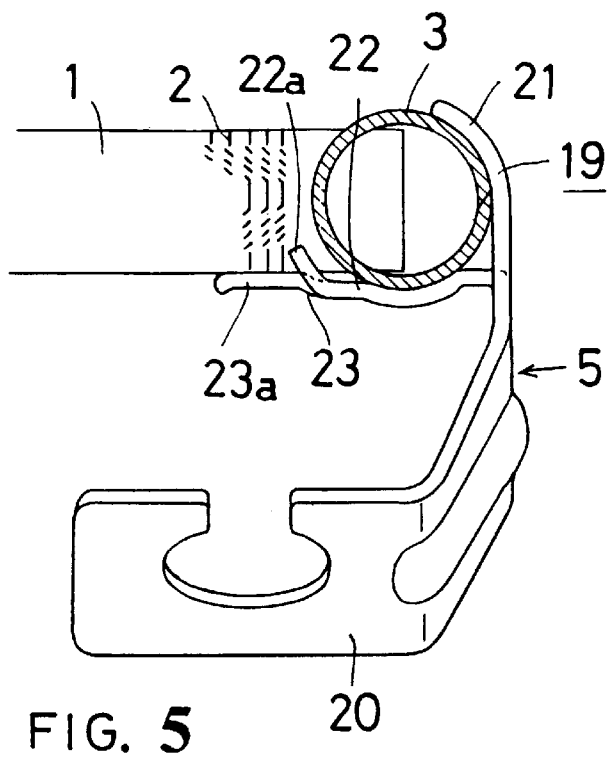
FIG. 5 is a plan view of an upper bracket attached to the heat exchanger at an upper portion thereof which is shown in cross section.
Figure 6:
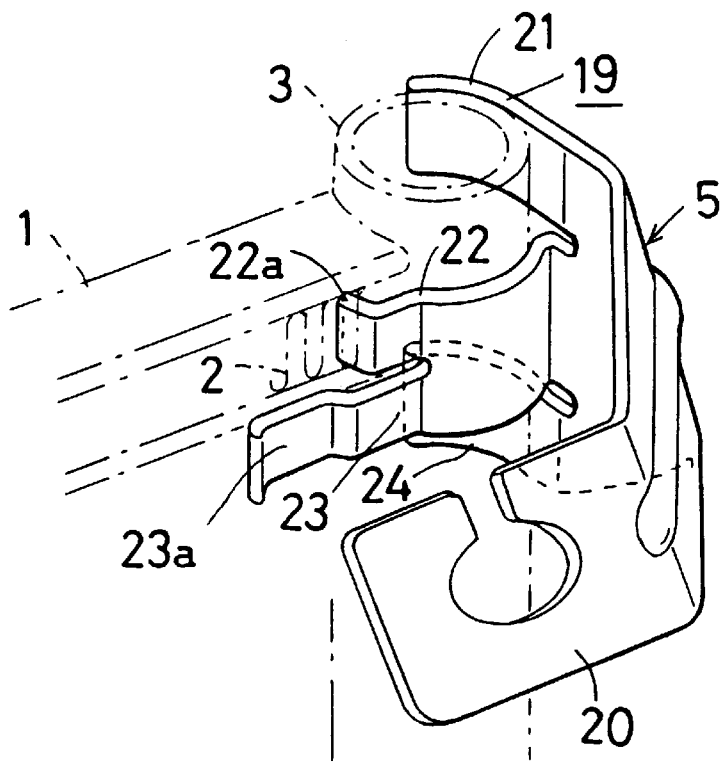
FIG. 6 is a perspective view of the upper bracket.

FIGS. 1, 2 and 4 show the span of the lower bracket 4 extending between the right-hand and left-hand headers 3 and 3. This bracket 4 connecting the headers one to another does comprise a steel stay 15 U-shaped in cross section and a pair of L-shaped fasteners 16. Those fasteners 16, which are made of a steel and spot welded or otherwise secured to the lower surface of steel stay 15 at its intermediate region, are used to mount the heat exchanger on a structural base such as the automobile body or other object. Elliptic holes 17 are formed through the end portions of the stay 15, and the pins 14 protruding from the header caps 3c penetrate this bracket through said elliptic holes.

Each upper bracket 5 made of an aluminum sheet or aluminum brazing sheet comprises an encircling portion 19 and a fastenable portion 20. The former portion 19 encircles the periphery of the header 3 in a manner illustrated in FIGS. 5 and 6, with the latter portion 20 being integral with the former so as to be fastened to the automobile body or the like. The encircling portion 19 comprises a first, a second, a third and a fourth curved tongues 21, 22, 23 and 24 separated by three slits. The middle ones 22 and 23 are retracted inwards such that they cooperate with the outer tongues 21 and 24 to grip the header 3. Circumferential contact of the header with each of the first to fourth tongues extends a semicircular distance or slightly more or less than it. The second tongue 22 has a positioning tip 22a forcibly inserted between adjacent tubes 1 and 1, which is this tongue's extremity bent towards the tubes 1. The third tongues 23 has an anti-rotation tip 23a, which protrudes from this tongue's extremity so as to bear against the core of this heat exchanger.

Figure 7:
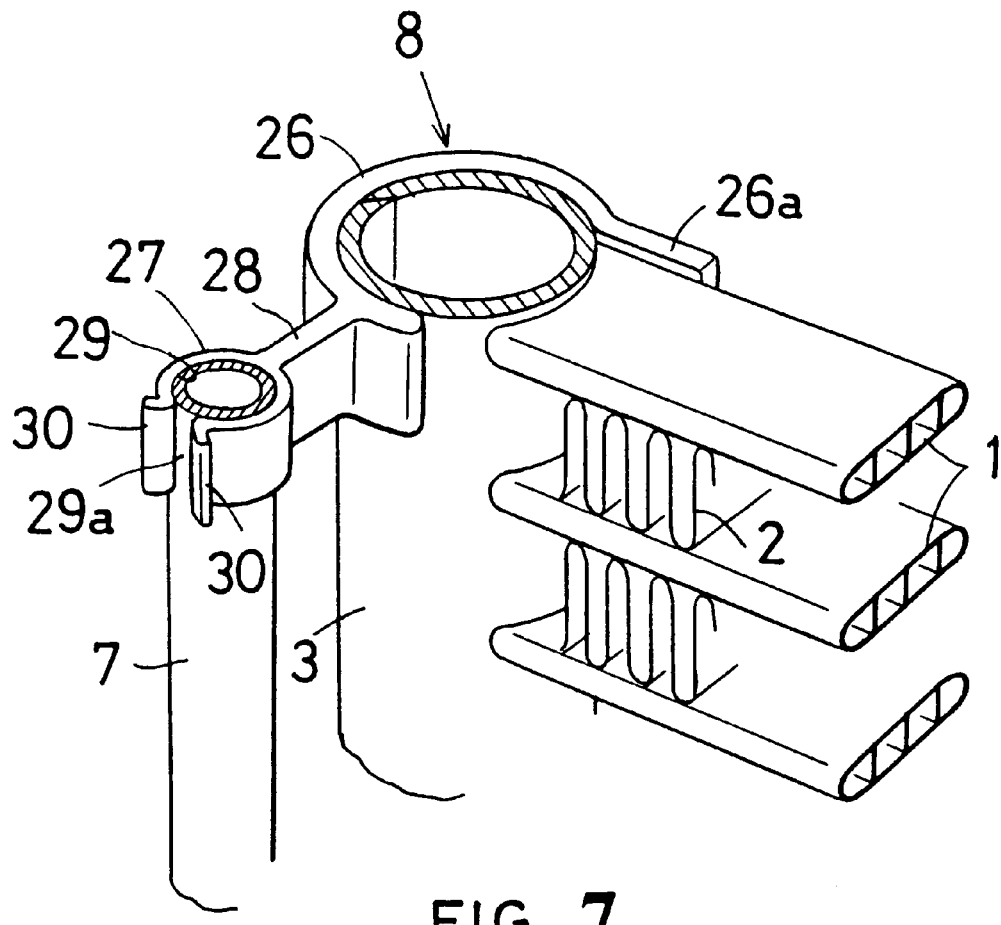
FIG. 7 is a perspective view showing an additional bracket together with a relevant members, this bracket supporting an intermediate portion of a coolant outlet.
Figure 8:
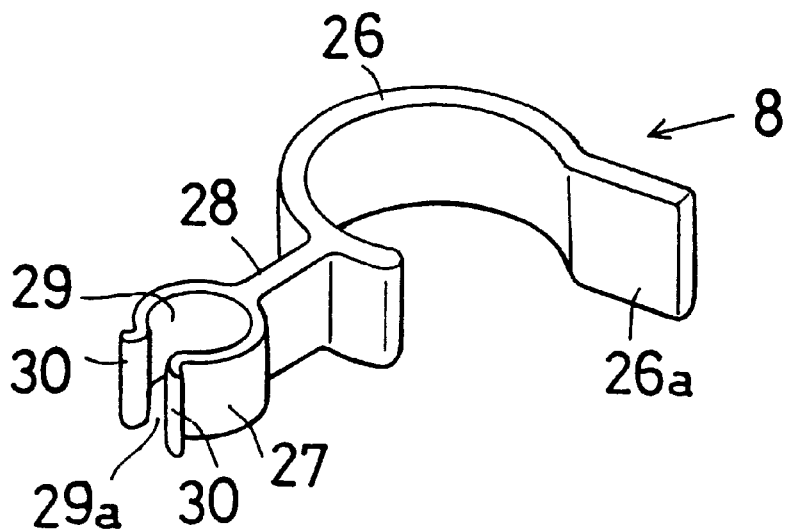
FIG. 8 is another perspective view of the additional bracket shown in FIG. 7.
Figure 11:
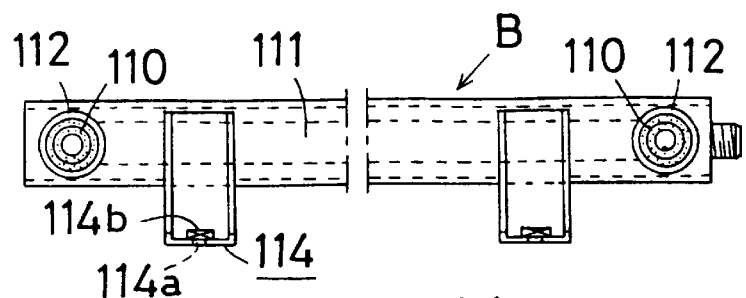
FIG. 11 is a plan view also showing the heat exchanger shown in FIG. 9.

The additional bracket 8 is severed from an elongate extruded aluminum article, and comprises as shown in FIG. 7 and 8 an encircling portion 26, a clamping portion 27 and a tie bar 28 connecting the former two portions one to another. The encircling portion 26 extend circumferentially of the header 3 slightly more than its semicircular periphery, while the clamping portion 27 gripping the intermediate portion of the coolant outlet 7. One end of the encircling portion 26 is formed as an anti-rotation tip 26a which inhibits the bracket 8 to rotate around the header 3. The clamping portion 27 has a cavity 29 which is formed between walls 30 so as to fit on the outlet 7 around over its semicircular periphery. The walls 30 have confronting ends which define an entrance 29a, and their outer extremities are bent outwardly in opposite directions so that the coolant outlet 7 can be inserted smoothly into the cavity 29. In order to ensure the rigid adjoining of the bracket 8 to the outlet 7, the latter is a clad pipe having its outer periphery coated with a brazing agent layer. In detail, the pipe may be a seam welded pipe made of an aluminum brazing sheet.

All the members other than the lower bracket 4 will be assembled to provide a temporary assembly, before it is heat treated in a brazing oven. In this oven, the abutted side edges of each header pipe 3a are brazed one to another while the other mating members such as those header pipes and the respective caps 3c fitted thereon being simultaneously brazed one to another to thereby construct the heat exchanger.

Subsequently, the lower bracket 4 will be attached to the lower portion of the heat exchanger constructed in the described manner. In detail, the stay 15 will be disposed to extend between the lower ends of the right-hand and left-hand headers 3 and 3 such that the male-threaded pins 14 from the caps 3c do penetrate the elliptic holes 17 and protrude outwardly of the stay 15 to be fastened by the respective nuts 33.

In summary, the lower bracket 4 can now be easily fixed in position by means of the nuts 33 mating the threaded pins 14 protruding from the header caps 3c, thereby saving labor for attaching the bracket to the heat exchanger and also protecting the tubes 1 from any damages.. Since the bracket 4 has the stay 15 spanning the zone between the headers 3 and 3, the rigidity of the core composed of the tubes 1 and fins 2 is remarkably improved. Further, the stay 15 attached to the already brazed heat exchanger is free from any heat shrinkage which might take place during the brazing process. This enhances a higher precision to the distance between the fasteners 16 and 16 and enables a more accurate and surer mounting of the heat exchanger on the automobile body or the like.

Second Embodiment

Another example of the heat exchangers will now be described. This heat exchanger is also adapted for use as the condenser in the car air conditioner.

As will be seen in FIGS. 9 to 14, this heat exchanger also has a body "A" similarly to that in the first embodiment. This body "A" comprises a plurality of horizontal tubes 101 arranged one above another, fins 102 each interposed between two adjacent tubes, and headers 103 and 104 to which each tube is connected at its ends in fluid communication therewith.

Figure 12:
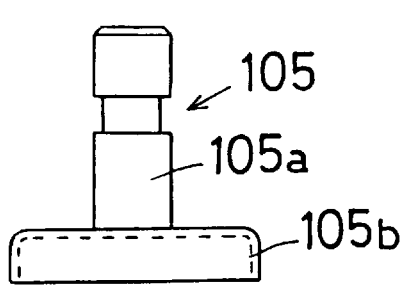
FIG. 12 is a front elevation of a cap which closes an open end of a header in the second embodiment.
Figure 13:
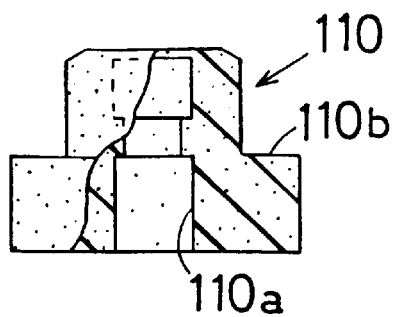
FIG. 13 is a front elevation showing, partly in cross section, a buffer designed to fit on the cap in FIG. 12.
Figure 14:
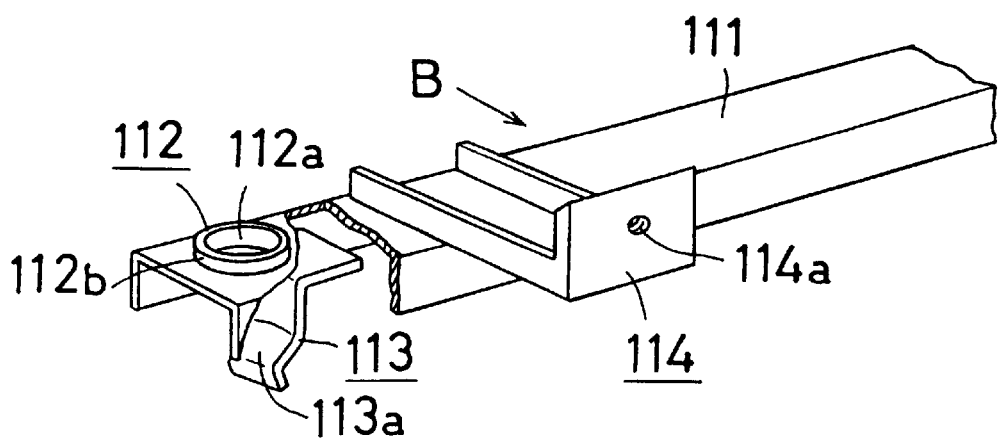
FIG. 14 is a perspective view of the heat exchanger shown in FIG. 9, with a bracket disassembled from a heat exchanger body shown in part.
Figure 14:
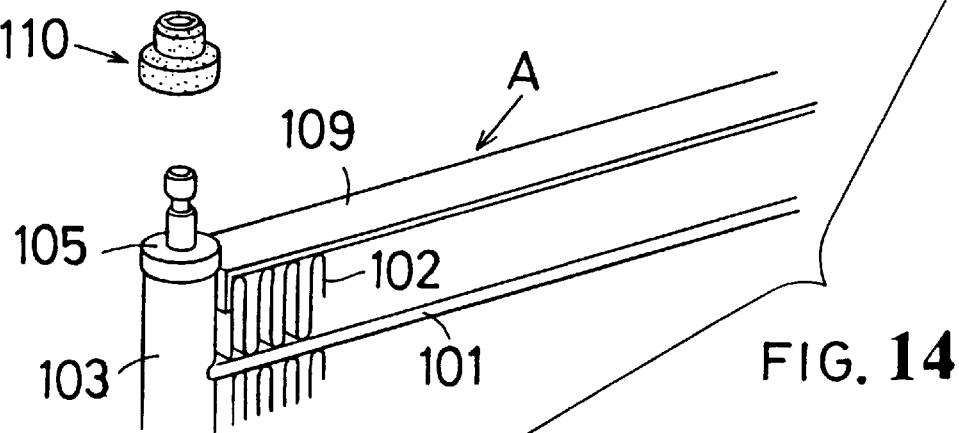

Each of the headers 103 and 104 is a pipe having an upper and lower open ends which are closed with caps 105 as illustrated in detail in FIG. 12. Each cap 105 has a pin 105a integral with a base portion 105b, which portion is fitted on and brazed to the pipe end. The pin 105a protrudes from the base portion, in axial alignment with the header.

Figure 9:
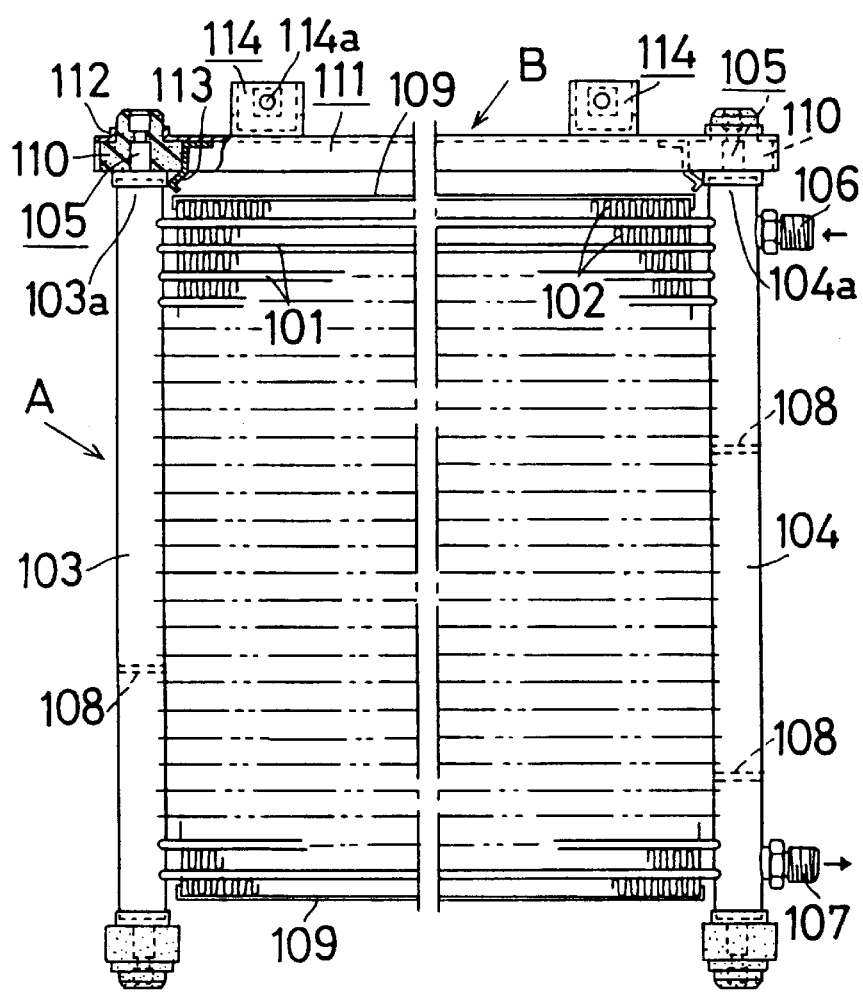
FIG. 9 is a front elevation showing, in its entirety, another heat exchanger provided in a second embodiment.
Figure 10:
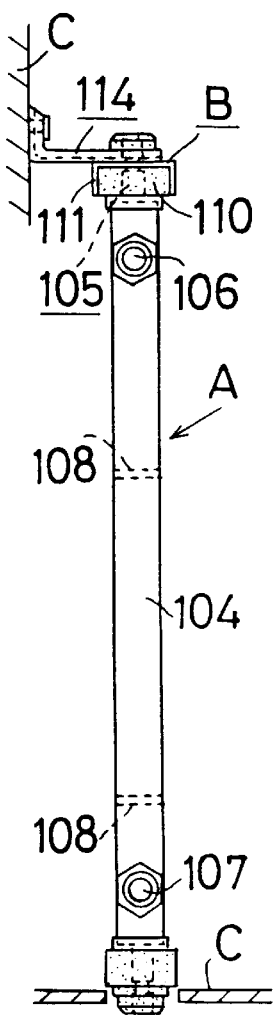
FIG. 10 is a side elevational view of the heat exchanger shown in FIG. 9.

FIG. 9 shows a coolant inlet 106 connected to an upper outer side of the right-hand header 104. Similarly, a coolant outlet 107 is connected to a lower outer side of the right-hand header 104. A partition 108 is fixed in the interior of the left-hand header 103 at a location near its one third height from bottom, thereby dividing the interior into an upper and lower chambers. Further partitions 108 are fixed in the right-hand header 104, one being located at about one sixth height from bottom and the other located a little above the middle height of the header. Thus, the coolant which has entered the right-hand header 104 through the inlet 106 is caused to advance in a meandering manner through groups of the tubes towards the outlet 107. The coolant flowing in this manner and air streams flowing through paths formed between the adjacent tubes 101 and each including the corrugated fin 102 will exchange their heat, so that the gaseous coolant is cooled down to condense into a liquid phase. The reference numeral 109 denotes an upper and lower side plates disposed outside the outermost corrugated fins 102.

Each cap 105 fitted on the upper or lower end of each header 103 or 104 is closely covered with a buffer piece 110. This piece 110 is made of an elastic material such as a rubber or soft plastics, and has an axial bore 110a of a shape corresponding to the pin 105a of the cap 105. A lower half of the buffer piece 110 is of a diameter greater than its upper half, to provide a shoulder 110b around its outer periphery. This piece 110 having the shoulder retained by a bracket, which will be described below, is unremovably fitted on the cap 105, with its pin 105a being accommodated in the bore 110a.

The bracket "B" disposed on the heat exchanger body "A" connects the upper end 103a of one header to that 104a of the other header. This bracket may typically be made of a strong steel, though can be made of an aluminum alloy similar to that for the body "A". A main member 111 of the bracket "B" is of a reversed U-shape in cross section and is so long as to extend between the right- and left-hand headers 103 and 104. Formed through the end portions of the main member 111 are holes 112a each of such a size as closely fitting on the upper halves of the buffer pieces 110. An upright flange 112b surrounds each hole 112a, to thereby form an engageable portion 112. Thus, the bracket "B" spans the area between the headers 103 and 104 of the body "A", with the buffer pieces 110 fitting in the respective engageable portions 112. Retainers 113 each formed with a hooked end 113a are fixedly adjoined to a back surface of the main member 111, at locations near its side ends. The hooked ends 113a bent towards the header 103 or 104 engage with the lower edges of the buffer pieces 110, whereby the bracket is prevented from slipping off the body "A" due to a light external force imparted to the bracket. Fastenable stays 114 of an L-shape in side elevation are adjoined to an upper surface of the bracket "B" at its portions near the side ends. Forward ends of the stays 114 protrude from the bracket and are formed each with a vertical wall 114, which has a horizontal bore 114a and a nut 114b adjoined to an inner surface thereof to provide a fastening means. Although the steel bracket "B" as in this embodiment will contribute the improvement in torsional rigidity, an aluminum alloy similar to that for the headers 103 and 104 may be used to manufacture the bracket.

The headers 103 and 104 have also at lower ends buffer pieces 110 engageable with corresponding holes of the structural base "C" such as the automobile body. In this state, the stays 114 of the bracket "B" will connect the heat exchanger body "A" to said base "C".

The bracket "B" need not necessarily be attached only to the upper ends of the body "A", but may be disposed at both of the upper and lower ends thereof, if considered appropriate in view of the relationship between the body "A" and the base "C".

In summary, the heat exchanger provided in the second embodiment comprises the caps having their ends closed with the caps which are formed with the protruding engageable pins. The buffer pieces, which closely cover the pins and are fitted in the holes through the side ends of the bracket, are prevented from being displaced relative to the caps. Further, those buffer pieces are also effective to compensate a possible dimensional error in manufacture of the heat exchanger body so that the bracket can be attached thereto without any difficulty.

By virtue of the cushioning effect of the buffer pieces interposed between the bracket and the body, any external vibrational energy transmitted through the former is absorbed to improve the vibration resistance of the latter. The intervention of the buffer pieces is also effective to prevent a possible corrosion caused by the contact potential difference between the aluminum alloy heat exchanger body and the steel bracket which would otherwise be laid in direct contact with said body.

A temporary assembly of the heat exchanger body composed of the various members cannot be free from a dimensional error, particularly in the distance between the headers, before and after the one-shot brazing in an oven. However, the accuracy in position and dimension of those bolt holes or stays formed through or fixedly adjoined to the bracket is irrelevant to such an error, thus ensuring an easy and quick mounting of the heat exchanger on the automobile body or the like.

Since the bracket extend between the headers and has its ends connected thereto, the heat exchanger in this embodiment also has an improved torsional rigidity.

Third Embodiment

Figure 15:
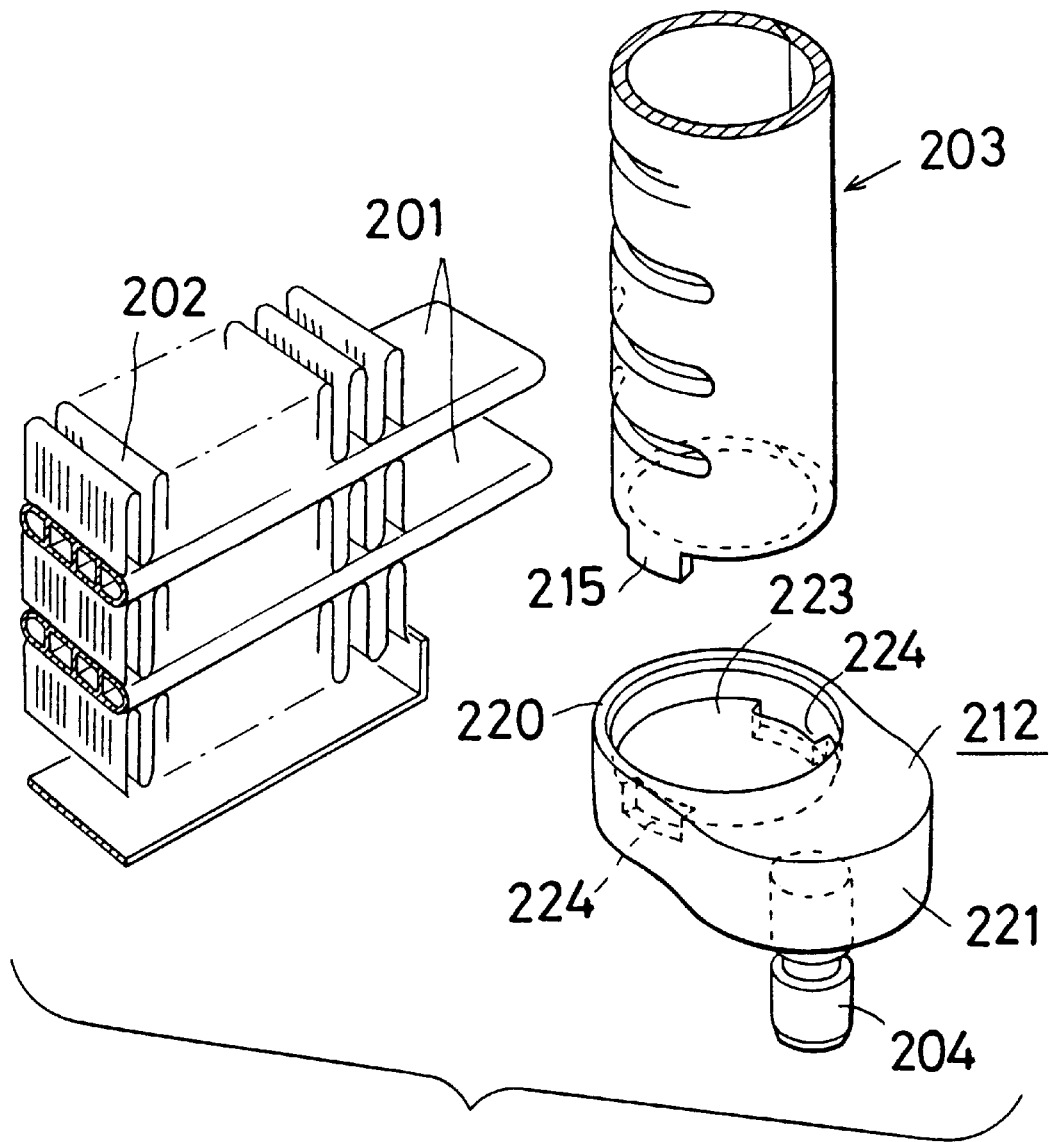
FIG. 15 is a perspective view of relevant members constituting a heat exchanger provided in a third embodiment, the members being tubes, a header and a cap which are shown in their disassembled state.
Figure 17:
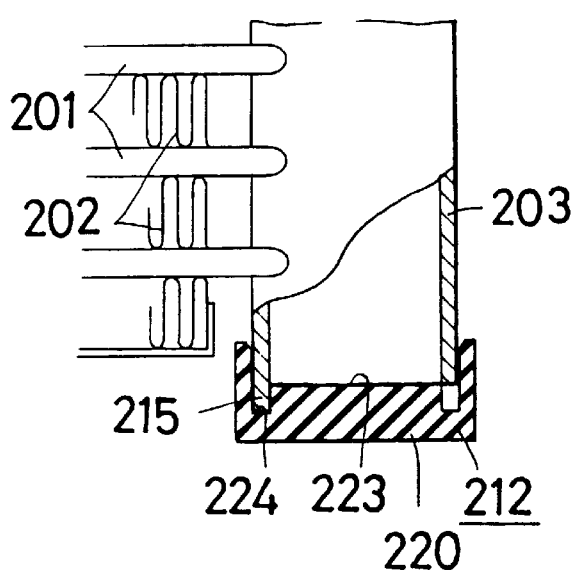
FIG. 17 is a cross section taken along the line 17-17 in FIG. 16.
Figure 16:
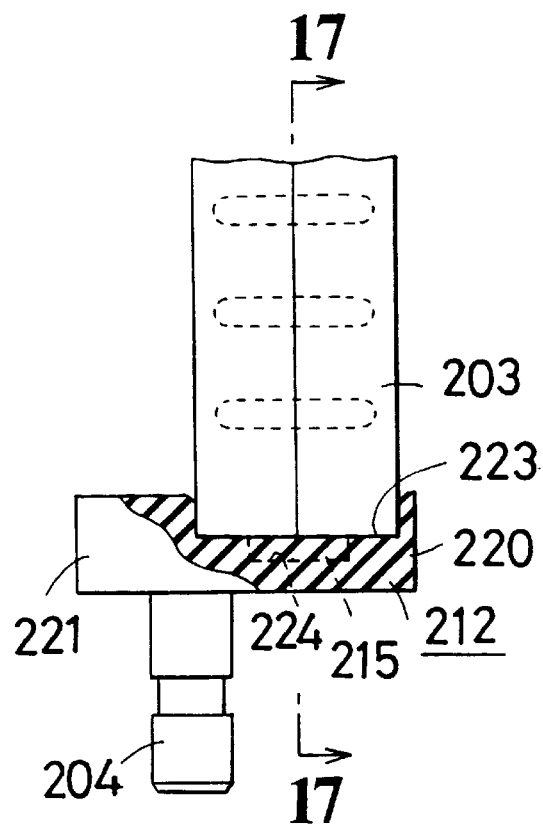
FIG. 16 is a front elevation of the members in FIG. 15, shown partly in cross section.
Figure 18:
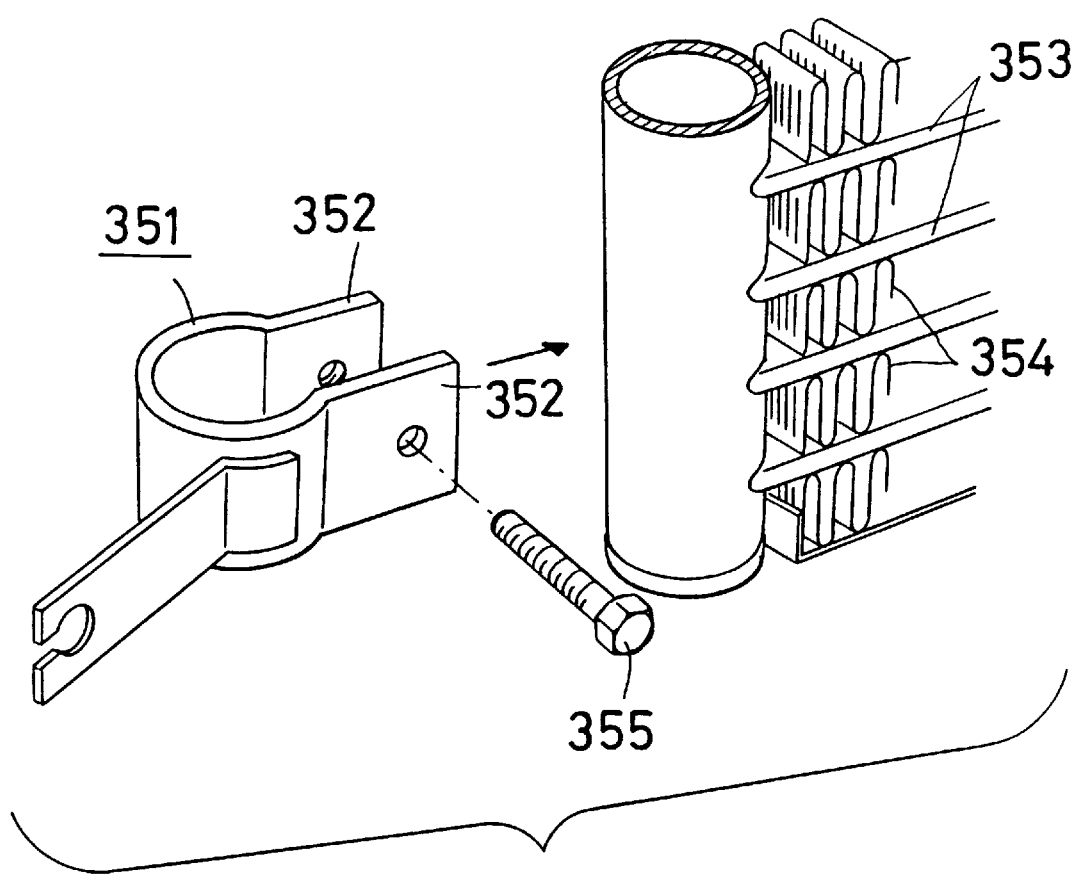
FIG. 18 is a perspective view of a prior art bracket which is attachable to a header in a known conventional heat exchanger.

FIGS. 15 to 17 show a third embodiment, wherein a cap 212 for closing the open end of each of headers 203 is modified in its shape. Details of tubes 201, fins 202 and the headers 203 are the same as those in the foregoing embodiments.

This cap 212 is a forged aluminum piece, and as shown in FIG. 15, comprises a main portion 220 and a horizontal extension 221 integral therewith. The main portion 220 is designed to close the lower open end of the header 203, and this portion 220 and the extension 221 do assume as a whole an elliptic block. An extent to which the extension 221 having a jutting pin 204 protrudes from the main portion will be determined depending on a desirable distance between the pin 204 and an axis of the header 203. A shallow cylindrical recess 223 of a given depth and formed in the main portion 220 opens upwards to receive the end of the header 203. Slit-shaped grooves 224 are formed downwards in the bottom of said recess 223, at given angular positions. A positioning lug 215 jutting out downwards from the lower end of the header 203 is shaped to fit in one of the grooves 224. It will be understood that the angular position of each slit-shaped groove depends on a desired angular position of the pin 204 with respect to the axis of said header. Since two grooves 224 are formed in each cap 212, it can be fitted either on the right-hand header 203 or the left-hand header 203. The jutting pin 204 is integral with and protrudes from a center of the lower surface of said horizontal extension 221.

The eccentricity of the jutting pin 204 with respect to the header axis can readily be changed by adjusting the length of the horizontal extension 221 of the cap 212. The angular position of this extension relative to the header may also be altered by changing the positions of said grooves 224 in the cap 212.

The jutting pin 204 may also be formed on an upper cap for closing the upper end of the header 203, though it is formed on the lower cap 212 in this embodiment.

It will be understood that the eccentric pin of the cap closing the header end may be disposed at any desired angular position or any distance from the header axis, by changing the shape of said cap having the horizontal extension, or by altering angular position of said cap fitted on the header. Thus, the eccentric distance or angle of the pin can be modified easily with a less designing labor and at a low manufacture cost.

What is claimed is:

1. A heat exchanger comprising:

tubes and fins alternating with the tubes;

the tubes and the fins being stacked one on another;

a pair of hollow headers;

each tube having both ends connected to the headers in fluid communication therewith; and upper and lower caps for closing upper and lower open ends of the headers, respectively;

each cap including a pin that protrudes upwards or downwards from the cap and that extends eccentrically of an axis of the cap, each cap and pin being a one-piece integrally formed unit and defining a cavity for receiving an end portion of the header that the cap closes, the pins being adapted to secure thereto one or more brackets for mounting the heat exchanger on a structural base such as an automobile body, each pin being a male-threaded short rod insertable in a corresponding hole formed through the bracket, each pin mating a nut fastened thereto to hold in place said bracket.

2. A heat exchanger as defined in claim 1, wherein the headers are arranged right and left, and the bracket is of a length extending between the right-hand and left-hand headers, so that side end portions of the bracket are fixed in place by the two pins protruding from the upper caps or the lower caps closing the ends of the headers.

3. A heat exchanger as defined in claim 1, wherein each pin extends coaxially with the cap.

4. A heat exchanger as defined in claim 1, wherein each pin is closely covered with a buffer piece made of an elastic material.

* * * * *